W. VON SZCZEPKOWSKI & F. VON SKRZYDLEWSKI.
APPARATUS FOR WATERING FIELDS.
APPLICATION FILED MAY 20, 1912.
1,098,853.
Patented June 2, 1914.
2 SHEETS—SHEET 1.
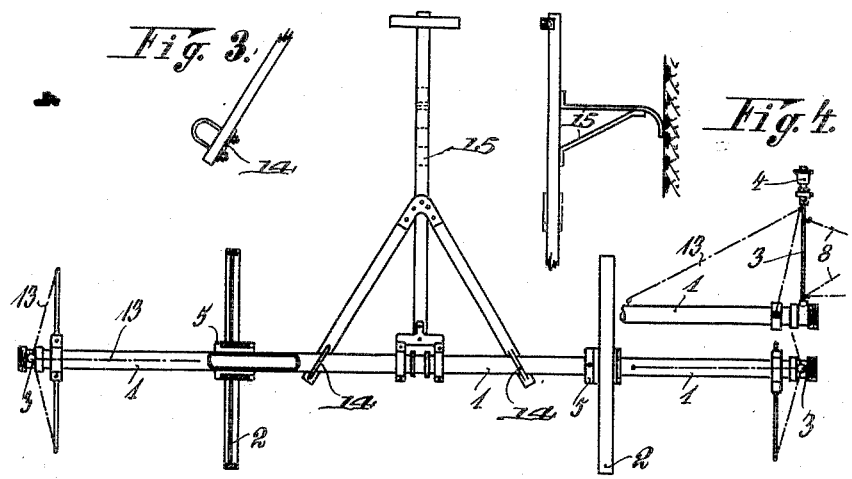
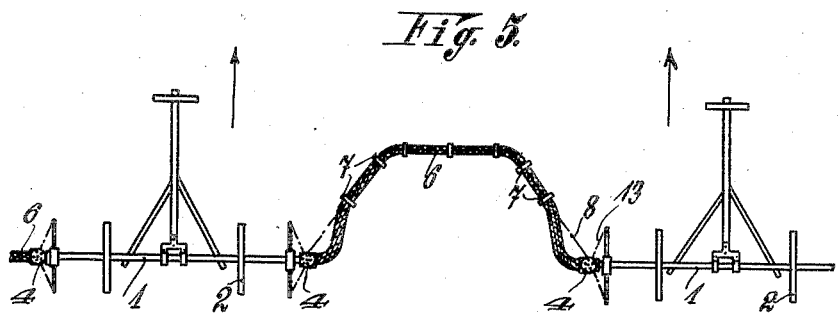
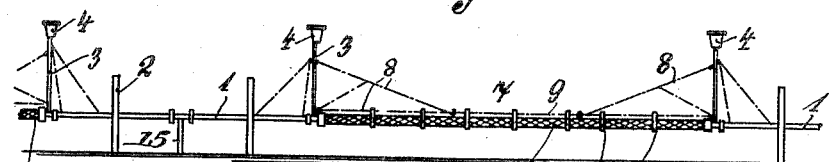

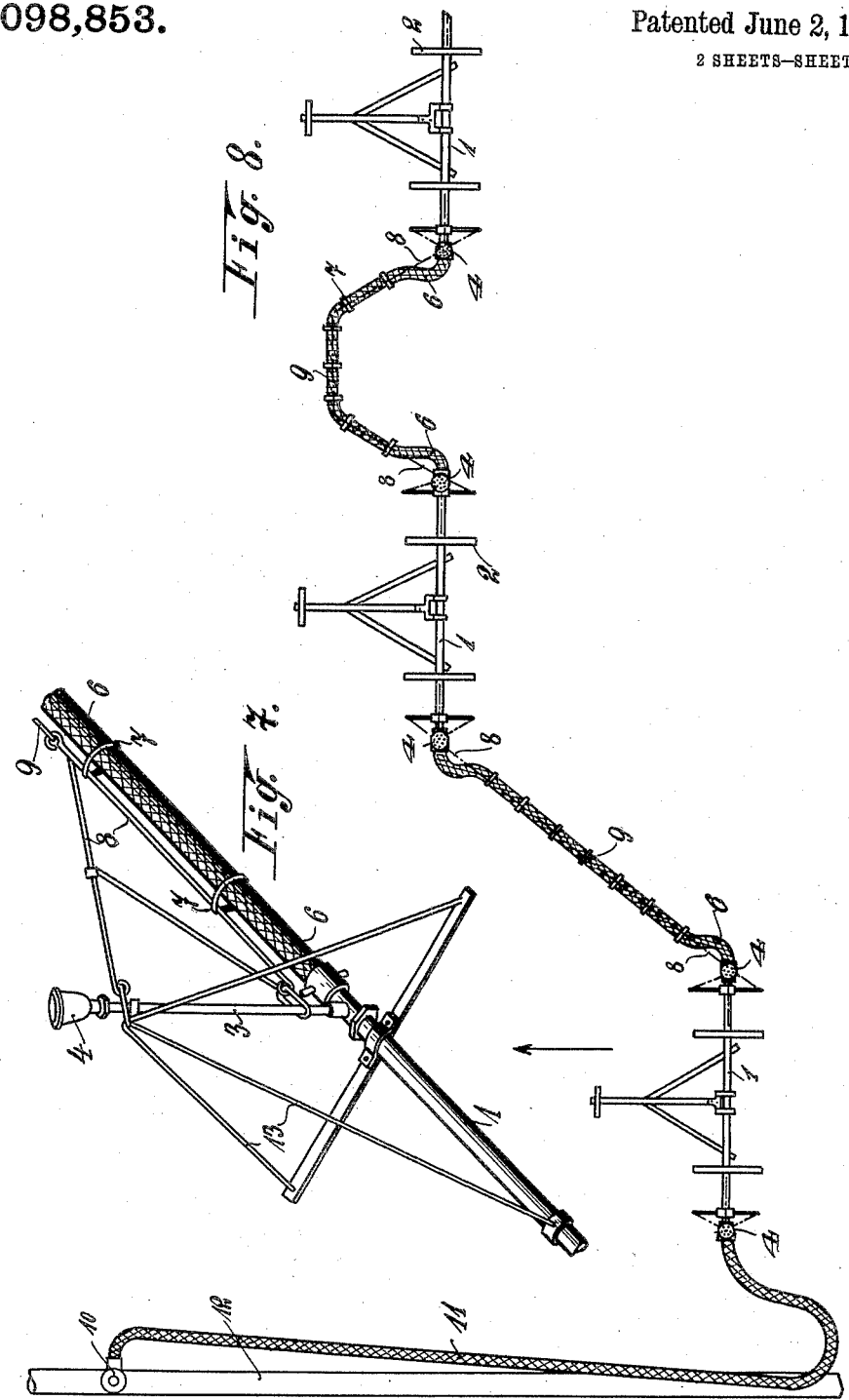

UNITED STATES PATENT OFFICE.

WLADISLAUS von SZCZEPKOWSKI, OF LENG, NEAR SCHRIMM, AND FRANZ von SKRZYDLEWSKI, OF POSEN, GERMANY.

APPARATUS FOR WATERING FIELDS.

1,098,853.   Specification of Letters Patent.   Patented June 2, 1914.

Application filed May 20, 1912. Serial No 698,508.

*To all whom it may concern:*

Be it known that we, WLADISLAUS VON SZCZEPKOWSKI, residing at Leng, near Schrimm, Province of Posen, Germany, and FRANZ VON SKRZYDLEWSKI, residing at Posen, Germany, both subjects of the German Emperor, have invented certain new and useful Improvements in Apparatus for Watering Fields, of which the following is a specification.

The subject of the present invention is an apparatus for watering extensive lands, fields, meadows and the like.

The invention consists essentially in the arrangement of a transportable pressure conduit laid over the field and provided at regular intervals with water connections, which are attached in series to a closed chain of water carts that are drawn over the field in such a manner that the carts, after being drawn over that portion of the field lying on one side of the pressure conduit, describe a semi-circle around the last water connection, and return in the same manner on the other side of the conduit. The advance movement of the chain of water carts is effected by intermittingly moving the individual carts, which are connected for this purpose by means of flexible water hose. These are always held in a horizontal position by means of pivoted arm supports and permit a simultaneous advance movement of the individual carts.

A form of construction of the invention is illustrated in the accompanying drawing, in which—

Figure 1 shows a plan view of a water cart; Figs. 2 to 4 side views of details of Fig. 1; Fig. 5 a plan view of the connection of two carts; Fig. 6 a back view of said connection; Fig. 7 a perspective view of the connecting supports, while Fig. 8 shows the operation of the carts.

The individual water carts, of which any desired number may be connected to form a continuous chain, corresponding to the width of the field to be watered, consist substantially of a pipe 1 to which brackets 14 for the steering rod 15 are secured, and on which the traction wheels are mounted on slidable sleeves 5, so that said wheels can be adjusted in any desired distance from each other. The pipes 1 carry at each end a vertically secured pipe 3, terminating in a sprinkling nozzle 4; the latter may be adjusted for any quantity of water. Pivotally attached to the pipes 3, are horizontally movable arms 8, which preferably are constructed in such a manner as to form a truss-frame, the pipes 3 acting as stands, which latter are braced in a suitable manner by tension rods 13. To the ends of two adjacent arms 8 connecting rods 9 are pivotally attached and to the connecting structure thus formed, the hose 6 is fastened by means of straps 7 in such a manner that it cannot touch the ground. This manner of suspension of the hose renders it possible for the individual carts to advance in a straight line, the hose, without touching the ground, gradually extending into a diagonal direction (Fig. 8).

Across the field to be watered a pressure conduit 12, provided at intervals of about 60 meters with attachment pieces 10 for connecting the hose, is laid and is connected with a pumping station. The individual water carts, which are connected with each other, are first positioned in a straight line, perpendicularly to the conduit 9 (Fig. 5) the first cart being connected by a hose 11, which has a length of about 30 meters, with the nearest water connection 10 (Fig. 8). The carts are subsequently advanced at regular intervals, until they again form a straight line, whereupon the intermittent advance motion is repeated. During this advance movement the connecting hose 6 gradually passes from the curved position to the extended position. The carts turn around the last water connection in a semicircle in order to, in the same manner, water the ground lying at the other side of the conduit 12. When turning the carts around said last water connection the inner nozzles 4 are turned off to a suitable extent, so that notwithstanding the different distances to be traversed by the individual nozzles, the field is evenly watered.

Very large areas are divided into parts of suitable size, which are subsequently watered by moving the conduit. The wheels are adjusted on the axle, in such a manner that they move between the seed drills. The carts are singly advanced, by hand, and the intervals between the periodical advancing movements are so timed that the ground receives the desired quantity of water. After the carts have been advanced for about 60 meters, that is to say as far as the center between two consecutive attachment points, the hose is attached to the next water connection 10. The length of the axle-pipes and the horizontal distance between the carts depend on the radius of action of the sprinkling nozzles, which radius also influences the advancing movement of the individual carts.

What we claim as new and desire to secure by Letters Patent is:

1. An irrigating apparatus comprising in combination, a plurality of trucks each comprising a pipe axle and supporting wheels therefor, a handle connected with each pipe axle to advance the respective truck independently of the other trucks, flexible pipe connections between adjacent pipe axles, the flexible pipes and the axles of the trucks coöperating to form a continuous extensible wheeled conduit, sprayers supported on said trucks and communicating with said conduit, arms forming a truss-frame, said arms being pivotally connected with the supports for said sprayers, straps for suspending said flexible pipe connections from said arms, for horizontally supporting the flexible pipes between two of the trucks, and means for supplying water to one end of said conduit, substantially as described.

2. An irrigating apparatus comprising a plurality of trucks each comprising a pipe axle and supporting wheels therefor, a handle connected with each pipe axle to advance the respective truck independently of the other trucks, flexible pipe connections between adjacent pipe axles, the flexible pipes and the axles of two trucks coöperating to form a continuous extensible wheeled conduit, arms for supporting the flexible connections between two of the trucks above the ground, rods pivotally secured to the ends of two adjacent arms forming with the same a carrier for said flexible connections, sprayers on said trucks connected with said conduit, and means for supplying water to one end of said conduit, substantially as described.

In testimony whereof we affix our signatures in presence of two witnesses.

WLADISLAUS von SZCZEPKOWSKI.
FRANZ von SKRZYDLEWSKI.

Witnesses:
ERNST KITZ,
ERNST BLENSCH.